United States Patent [19]

Ishimaru et al.

[11] 3,896,118

[45] July 22, 1975

[54] PROCESS FOR PRODUCING 7-AMINOCEPHALOSPORANIC ACIDS

[75] Inventors: Toshiyasu Ishimaru, Osaka; Yutaka Kodama, Toyama, both of Japan

[73] Assignee: Toyama Chemical Co., Ltd., Tokyo, Japan

[22] Filed: Oct. 8, 1971

[21] Appl. No.: 187,910

[30] Foreign Application Priority Data

Nov. 17, 1970 Japan.............................. 45-90973

[52] U.S. Cl............................. 260/243 C; 424/246
[51] Int. Cl............................................. C07d 99/24
[58] Field of Search ................................ 260/243 C

[56] References Cited
UNITED STATES PATENTS

| | | | |
|---|---|---|---|
| 3,499,909 | 3/1970 | Weissenberger et al. | 260/243 C |
| 3,575,970 | 4/1971 | Weissenberger et al. | 260/243 C |
| 3,809,699 | 5/1974 | Ishimaru | 260/306.7 |

*Primary Examiner*—Nicholas S. Rizzo
*Attorney, Agent, or Firm*—Oblon, Fisher, Spivak, McClelland & Maier

[57] ABSTRACT

7-aminocephalosporanic acids have been prepared, in an industrially advantageous manner, by reacting 7-aminocephalosporanic acids with a halogenated compound, represented by the formula (III-1) to (III-4), in the presence of an acid-binding agent, to protect the carboxy group of the said 7-acylamidocephalosporanic acid derivatives, by forming a mixed acid anhydride grouping, converting the reaction product into the corresponding imino halide by further reaction with an imino halide-forming reagent, converting the resultant imino halide into the corresponding iminoether, and removing the protecting group of the carboxyl group to form 7-aminocephalosporanic acids.

13 Claims, No Drawings

PROCESS FOR PRODUCING 7-AMINOCEPHALOSPORANIC ACIDS

BACKGROUND OF THE INVENTION

1. Field Of The Invention

The present invention relates to an improved process for producing 7-aminocephalosporanic acids, and more particularly to a process for producing 7-aminocephalosporanic acids of the general formula (I):

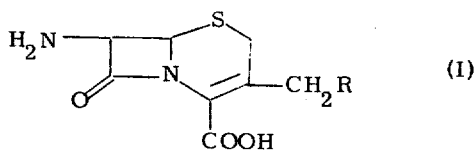

wherein R signifies a hydrogen atom, halogen atom, acetoxy, lower alkoxy, or S-Y group such as lower alkylthis (Y signifies alkyl, aryl, or heterocyclic group) from 7-acylamidocephalosporanic acid derivatives by a chemical process.

2. Description Of Prior Art 7-aminocephalosporanic acids are useful compounds as starting materials for the production of synthetic cephalosporins, which show significant antibacterial properties.

It is known that 7-aminocephalosporanic acids can be prepared from 7-acylamidocephalosporanic acid derivatives by treating the ethyl ester or benzyl ester of 7-acylamidocephalosporanic acid derivatives, for example, with a phosphorus pentachloride to form an imidochloride, and then reacting the imidochloride with an alcohol to form an imidate, and then hydrolyzing the imidate (See Japanese Patent Publication No. 13862/66 and Dutch Patent No. 640142).

However, this process requires hydrolyzation of the ester using a trifluoroacetic acid and anisole or a catalytic reducing process. Under these conditions, there is a high probability of cleavage of the chemically unstable β-lactam ring, with the result that the yield of the intended product is very low and not acceptable for industrial application.

SUMMARY OF THE INVENTION

Accordingly, it is one object of this invention to provide an improved process for producing 7-aminocephalosporanic acids.

It is another object of this invention to provide a process for producing 7-aminocephalosporanic acids from 7-acylamidocephalosporanic acid derivatives.

It is a further object of this invention to provide a novel process for protecting the carboxyl group of 7-acylamidocephalosporanic acid derivatives in a mixed acid anhydride.

These and other objects have now been attained by the discovery that the carboxyl group of the 7-acylamidocephalosporanic acid derivatives can be protected by conversion into a mixed acid anhydride. According to the process of this invention, 7-aminocephalosporanic acids are produced by protecting the carboxyl group of 7-acylamidocephalosporanic acid derivatives in the form of mixed acid anhydrides. The mixed acid anhydrides are reacted with an imido halide-forming reagent to form the corresponding imido halide, which is reacted with a hydroxyl compound, and then hydrolyzed.

DETAILED DESCRIPTION OF PREFERRED EMBODIMENTS

The compounds of the following general formula are used as the 7-acylamidocephalosporanic acid derivative reactants used in this invention:

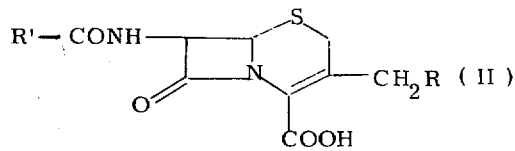

wherein R' signifies a hydrogen atom, a substituted or unsubstituted alkyl, thienyl lower alkyl aryl, aralkyl, aryloxyalkyl group, or

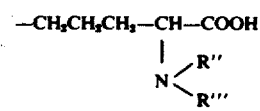

wherein R" signifies a hydrogen atom, 2,4-dinitrophenyl,2,4,6-trinitrophenyl, trityl, organic sulfonyl group, or

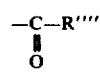

(R"" signifies a substituted or unsubstituted alkyl, aralkyl, aryl, alicyclic or alicyclic alkyl group.) R''' signifies a hydrogen atom or may jointly form a ring together with R" to provide a phthaloyl, succinoyl or maleinoyl group. R is the same as aforesaid.

Alternatively, other reactants may be used as the starting material of this invention, including cephalosporin C, obtained by biological processes, or its derivatives substituted at the 3-position thereof, or the derivatives in which the basicity of its N is weakened, such as, for example, N-2,4-dinitrophenyl,N-2,4,6-trinitrophenyl, N-trityl, or N-acyl derivatives; or cephalosporin, obtained by the ring expansion process of penicillin compounds, such as, for example, 7-phenoxyacetamido-3-methyl-Δ³-cephem-4-carboxylic acid, 7-phenylacetamido-3-methyl-Δ³-cephem-4-carboxylic acid, 7-phenylacetamido-3-methoxymethyl-Δ³-cephem-4-carboxylic acid, 7-phenylacetamido-3-bromomethyl-Δ³-cephem-4-carboxylic acid, 7-phenoxyacetamido-3-bromomethyl-Δ³-cephem-4-carboxylic acid, 7-phenoxyacetamido-3-methoxymethyl-Δ³-cephem-4-carboxylic acid, 7-formamido-3-bromomethyl-Δ³-cephem-4-carboxylic acid, 7-phenylacetamido-3-methylthiomethyl-Δ³-cephem-4-carboxylic acid, 7-phenoxyacetamido-3-methylthiomethyl-Δ³-cephem-4-carboxylic acid, of the compounds (II) may preferably be used from a practical viewpoint. These are ordinarily used as a tertiary amine, alkali or alkaline earth metal salt.

The compounds used for forming the protecting group for the carboxyl group include the halogenated compounds of any of the following formulae (III-1) to (III-4):

wherein each of $R^1$ and $R^2$, which may be the same or different, signifies halogen atom, a substituted or unsubstituted lower alkyl, aryl, aralkyl, lower alkoxy, aryloxy, or aralkyloxy group, and may jointly form a ring. X signifies a halogen atom, $M^1$ signifies a boron, aluminum, or phosphorus.

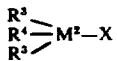 (III-2)

wherein $R^3$ signifies a substituted or unsubstituted alkyl, aryl, aralkyl, alkoxy, aryloxy, aralkyloxy group, and each of $R^4$ and $R^5$ signifies a substituted or unsubstituted alkyl, aryl, aralkyl, alkoxy, aryloxy, aralkyloxy group, halogen atom, or may jointly form a ring, or signifies O, S or $O_2$. $M^2$ signifies carbon or sulfur, and X is defined as above,

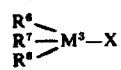 (III-3)

wherein $R^6$ signifies a substituted or unsubstituted alkoxy, aryloxy, aralkyloxy group, and each of $R^7$ and $R^8$ signifies a substituted or unsubstituted alkyl, aryl, aralkyl, alkoxy, aryloxy, aralkyloxy group, or halogen atom, $M^3$ signifies a silicon, and X signifies the same as above.

 (III-4)

wherein each $R^9$ and $R^{12}$ signifies halogen, lower alkoxy substituted by a lower alkoxy, phenoxy, phenyl lower alkoxy or phenol, lower alkoxy, and $R^{11}$ and $R^{12}$ may jointly form a ring or signify O. $M^4$ signifies a phosphorus, and X signifies the same as above.

Examples of the halogenated compounds of the formulae (III-1) to (III-4) are as follows:

Compounds of the formula (III-1):

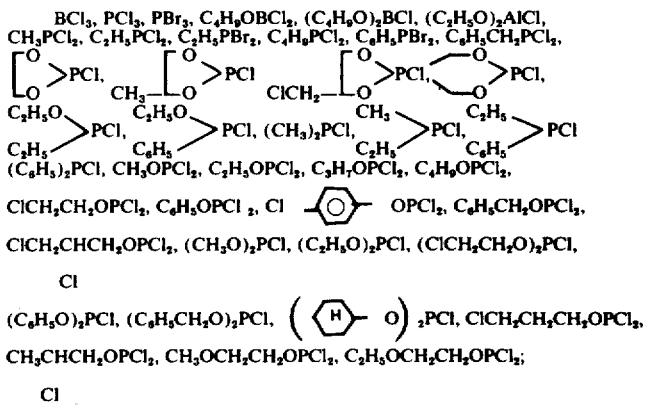

Compounds of the formula (III-2):

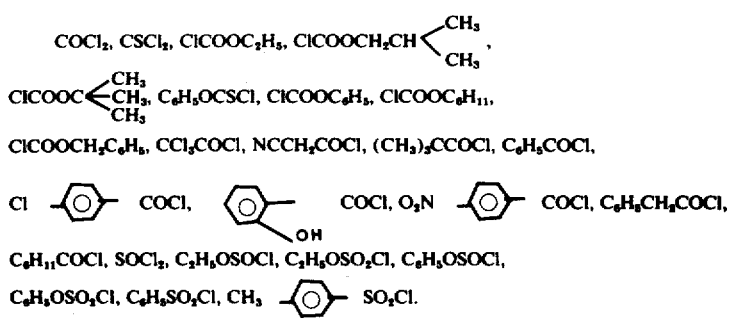

Compounds of the formula (III-3):

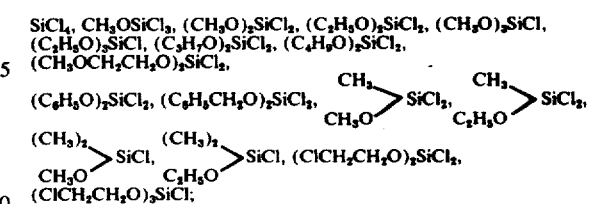

Compounds of the formula (III-4):

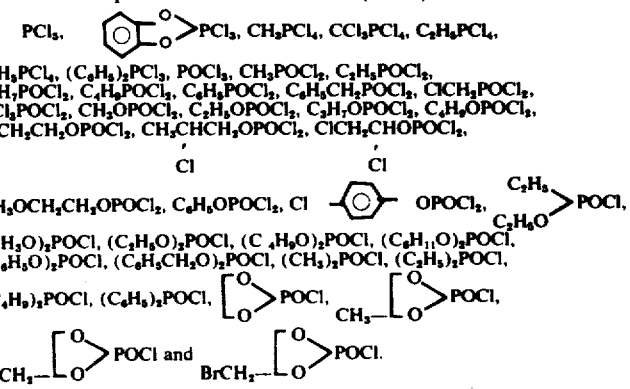

Suitable compounds of the formula (III), used in this invention, include phosphorus trichloride, phosphorus oxychloride, phosphorus pentachloride, phosgene, etc., which have been known as halogenating agents, but have not heretofore been used to provide protecting groups, until now. It is the present discovery that these compounds exhibit excellent properties in providing protecting groups for carboxylic acids. It is interesting that boron halides, silicon tetrachloride, etc., which had been known as Lewis acids, have been found to be useful also as protecting groups.

When a compound of the formula (III) contains two or more halogen atoms in its molecule, it is not clear whether all of the halogen atoms form a mixed acid anhydride with the carboxylic group of the compound of the formula (II), or not. For example, when using phosphorus trichloride in amounts of 0.5 to 0.8 mol. per mol. of the compound of formula (II), an extremely high yield was obtained. From this fact, it may be assumed that the reaction proceeds according to the following scheme:

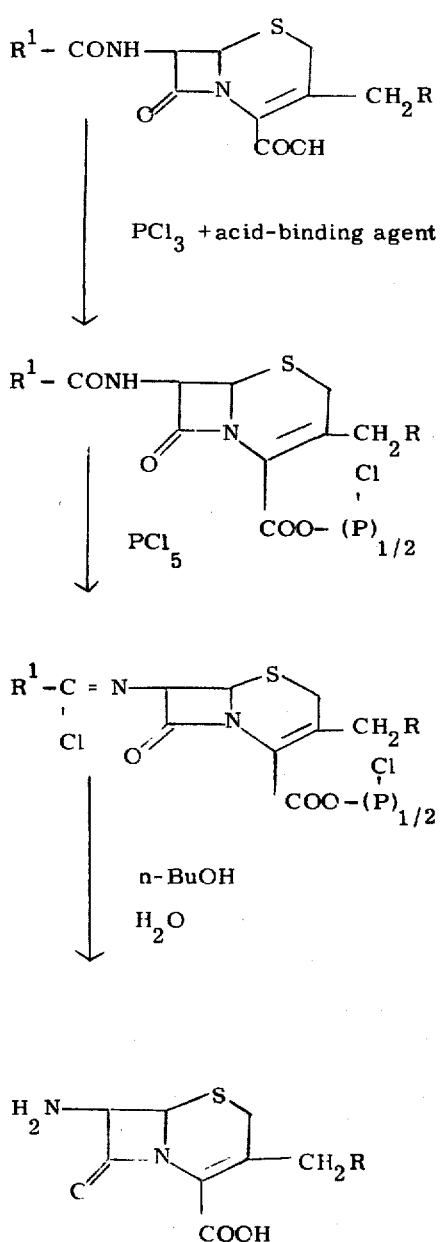

In carrying out the process of this invention, a compound of the formula (II), or a salt thereof, is dissolved or suspended in an inert solvent, such as, for example, methylene chloride, chloroform, ethylene chloride, trichloroethane, trichlene, tetrahydrofuran, dioxane, ethyleneglycoldimethylether, acetone, acetonitrile, ethyl acetate, or the like, and mixtures thereof, and an acid-binding agent is added thereto.

Suitable acid-binding agents include trialkylamines, N-alkylmorpholines, N-alkylpiperidines, pyridine, picolines, lutidines, quinolines, N,N-dialkylanilines, etc., and particularly N,N-dialkylanilines, pyridine, picolines, trialkylamines, lutidines are preferable.

To this mixture, at room temperature, or at a temperature below 0°C., is added a compound of the formula (III) in excess of the equivalent amount of the compound of the formula (II), and an acid-binding agent to form a mixed acid anhydride. It may sometimes be necessary to heat the mixture to a temperature above room temperature, depending upon the reactants used.

To the resulting solution of mixed acid anhydride is added an imido halide-forming reagent in excess of the equivalent mols, while being cooled to −60° to +30°C. Suitable imido halide-forming reagents include, for example, phosphorus oxychloride, phosphorus pentachloride, phosphorus tribromide, phosphorus pentabromide, phosgene, thionylchloride, oxalyl chloride, protocatechinylphosphorus trichloride, toluenesulfonylchloride, etc. Among these compounds, phosgene and phosphorus pentachloride are particularly preferred. The optimum conditions of this reaction may vary according to the type of reagents, solvents and acid-binding agents used. For example, when methylene chloride, N,N-dimethylaniline and phosphorus pentachloride are used, the reaction will be complete in 2 to 3 hours at a temperature of −50° to −30°C.

The resulting imido halide is then reacted with a hydroxyl compound at a temperature below 0°C.

Suitable hydroxyl compounds include those compounds of the following general formula:

wherein $R^{13}$ signifies a substituted or unsubstituted alkyl, aryl, aralkyl, alicyclic, or alicyclic alkyl group.

Among the compounds of the formula (IV), especially preferred are methyl alcohol, ethyl alcohol, propyl alcohol, butyl alcohol, amyl alcohol, ethylene chlorohydrine, β-cyanoethanol, 2-ethylhexyl alcohol, benzyl alcohol, cyclohexanol, ethyleneglycol monomethylether, ethyleneglycol monoethylether, etc.

The compounds of the formula (IV) are used in an amount of 3 to 20 mols per mol of the compound of the formula (II), and the formation of the imidate will be complete in 1 to 3 hours at a reaction temperature of −60° to +30°C. by adding, dropwise, an alcohol into the reaction mixture, or by adding, dropwise, a solution of imido chloride into an alcohol (IV). The imidate is formed almost quantitatively.

Upon addition of ice water, with stirring, to the thus obtained solution of imidate, both hydrolysis of the imidate and removal of the carboxyl-protecting group to obtain the compound of the formula (I) simultaneously occur.

When the pH of the reaction mixture is adjusted with a basic substance, such as, for example, triethylamine, aqueous ammonia, ammonium carbonate, alkali hydrogencarbonate, alkali carbonate, alkali acetate, alkali hydroxide, or the like, to the isoelectric point of the objective substance, crystals are deposited. These crystals are collected by filtration, and washed with water, aqueous acetone, or the like, the crude crystals of the compound of the formula (I) may be obtained in a yield of about 90%. These crude crystals are of extremely high purity, and may be used without further purification as the starting material for the manufacture of synthetic cephalosporins.

As mentioned above in more detail, the present invention provides a process for producing 7-aminocephalosporanic acids (I) from 7-acylamidocephalosporanic acids (II), which comprises protecting with a novel carboxyl protecting group, and then reacting from imido chloride, through imidate, directly to 7-aminocephalosporanic acids (I). Furthermore, in the present process 7-aminocephalosporanic acids (I) may be obtained in high yields by simplified procedures using inexpensive starting reactants, and these advantages make the process extremely valuable for industry.

Having generally described the invention, a further understanding can be obtained by reference to certain specific Examples which are provided herein for purposes of illustration only and are not intended to be limiting unless otherwise specified.

EXAMPLE 1

4 grams of a dry fine powder of anhydrous cephalosporin C sodium was suspended in 30 ml. of methylene chloride, and 4.6 grams of N,N-dimethylaniline and 3.6 grams of methoxy-dimethylsilylchloride were added thereto while being cooled in ice. The mixture was stirred at room temperature until the mixture became a generally yellow, transparent solution. After the mixture was stirred for 1 hour, it was cooled to −60°C., and 4 grams of a fine powder of phosphorus pentachloride was added, and the mixture was reacted for 2 hours at −60° to −40°C. Then, the mixture was again cooled to −60°C., and 10 ml. of n-butanol, containing a few droplets of N,N-dimethylaniline, was abruptly added, dropwise, while being held below −40°C. After the dropwise addition, the mixture was reacted below −40°C. for 2 hours, and was then allowed to gradually reach −10°C. and a mixed solution of 10 ml. of ice water and 10 ml. of methanol was added. The combined mixture was vigorously stirred at a pH of about 2.0 for 30 minutes and the pH thereof was then adjusted to 3.5 with an ammonium carbonate, and crystals were gradually deposited.

After the solution was kept overnight in an ice cabinet, the crystals were collected, and washed with 60%-methanol and acetone. Crude crystals of 7-aminocephalosporanic acid were obtained.

After these crystals were suspended in a small amount of water and the pH thereof was raised to 7 with sodium hydrogencarbonate to be dissolved therewith, the same amount of ethanol was added, and the solution was neutralized with 20%-hydrochloric acid while being cooled in ice. At a pH of 3.5, the solution was kept overnight in an ice cabinet. The deposited crystals were collected, and washed with 60%-methanol and acetone. 2.37 grams (91%) of the objective product were obtained.

The infrared absorption spectrum and thin layer chromatogram of the product was identical with those of the standard sample.

EXAMPLE 2

The procedure of Example 1 was repeated under the same reaction conditions, except that 4.0 grams of dimethoxymethylsilylchloride was used instead of methoxydimethylsilylchloride. 2.44 grams (93.5%) of the crystals of 7-aminocephalosporanic acid was obtained.

EXAMPLE 3

3 grams of potassium salt of 7-phenoxyacetamido-3-methyl-$\Delta^3$-cephem-4-carboxylic acid, 2.9 grams of N,N-dimethylaniline and 25 ml. of methylene chloride were mixed, and to the mixture was added, dropwise, 0.9 gram of phosphorus trichloride while being cooled in ice, and the mixture was stirred at room temperature for 30 minutes.

The reaction mixture was cooled to −60°C., and 1.85 g. of the powder of phosphorus pentachloride was gradually added thereto. After being stirred at −50°C. to −30°C. for 2 hours, the mixture was again cooled below −60°C. and 8.5 g. of n-butanol containing a few droplets of N,N-dimethylaniline was rapidly added, dropwise, thereto, while maintaining the temperature below −40°C. The mixture was stirred below −40°C. for 2 hours. The reaction mixture was added to 20 ml. of ice water, and after being stirred at a pH of about 1.0 for 30 minutes, 10 ml. of ethanol was added thereto, and the pH of the mixture was adjusted to 3.5 with ammonium carbonate, and then the mixture was kept overnight in an ice cabinet.

The crystals deposited were collected, and washed with 60%-methanol and acetone. 1.58 g (92%) of 7-amino-3-methyl-$\Delta^3$-cephem-4-carboxylic acid was obtained.

EXAMPLE 4

In place of phosphorus trichloride in Example 3, 7 ml. of solution of methylene chloride containing 0.65 g. of phosgene was added, dropwise, to the reaction, and 7-amino-3-methyl-$\Delta^3$-cephem-4-carboxylic acid was obtained in a yield of 88%.

EXAMPLE 5

4 g. of monosodium salt of N-phenylacetylcephalosporin C, 3.5 g. of dimethylaniline, and 25 ml. of methylene chloride were mixed and to the mixture was added 3.4 g. of trimethoxysilylchloride while being cooled in ice, and the mixture was stirred for approximately 1 hour. The reaction mixture was cooled to −60°C., and 3 g. of fine powder of phosphorus pentachloride was added thereto. After being reacted at −60°C. to −30°C. for 2 hours, the mixture was again cooled to −60°C., and thereto was rapidly added, dropwise, 12 g. of n-butanol containing a few droplets of N- methylpiperidine, while maintaining the temperature below −40°C., and was reacted for 2 hours. The temperature was gradually raised, and when the temperature reached −10°C., 10 ml. of ice water was added with vigorous stirring. The pH of the mixture was adjusted to 2.0, and then the mixture was stirred for 30 minutes. Here, 10 ml. of ethanol was added thereto, and the pH of the mixture was adjusted to 3.5 with 10% aqueous ammonia and then the mixture was kept overnight in an ice cabinet. The crystals were collected in an ordinary way, and washed with 60%-methanol, then with acetone. 1.77 g. (90%) of crystals of 7-aminocephalosporanic acid was obtained.

The purity was found to be 98% by the hydroxylamine method.

EXAMPLE 6

In place of trimethoxysilylchloride in Example 5, 2 g. of phenylphosphorusdichloride was used, and the same reaction was conducted. 1.85 g. (94%) of crystals of 7-aminocephalosporanic acid was obtained.

EXAMPLE 7

2 g. of sodium salt of cephalothin, 1.8 g. of N,N-dimethylaniline and 15 ml. of methylene chloride were mixed, and to the mixture was added dropwise 0.6 g. of ethyldichlorophosphite while being cooled in ice, and the mixture was stirred at 10° to 20°C. for one hour. The reaction mixture was cooled to −60°C., and 1 g. of fine powder of phosphorus pentachloride was added thereto, and the mixture was reacted at −45° to −40°C. for 2 hours. The mixture was again cooled to −60°C., and thereto was rapidly added, dropwise, 5.5 g. of n-butanol containing a few droplets of N,N-dimethylaniline while maintaining the temperature at −45° to −40°C., and was reacted for 2 hours. The temperature was gradually raised, and when the temperature reached −15°C., the combined mixture of 5 ml. of ice water and 5 ml. of methanol was added. The pH of the mixture was adjusted to 2.0, and the mixture was stirred vigorously for 30 minutes, and the pH of the mixture was adjusted to 3.5 with ammonium carbonate, and then the mixture was kept cooled.

The crystals deposited were collected, and washed with 60%-methanol, then with acetone. There was obtained 1.2 g (92%) of crystals of 7-aminocephalosporanic acid. The infrared absorption spectrum and thin layer chromatogram of the product was identical with those of the standard sample.

The purity was found to be 98% by the hydroxylamine method quantitatively.

EXAMPLE 8

The procedure of Example 7 was repeated under the same reaction conditions, except that 0.55 g. of methylmethoxysilyldichloride was used instead of ethyldichlorophosphite. 1.16 g. (89%) of crystals of 7-aminocephalosporanic acid were obtained.

EXAMPLE 9

2 g. of 7-phenylacetamido-3-methyl-$\Delta^3$-cephem-4-carboxylic acid was suspended in 30 ml. of methylene chloride, and 0.6 g. of triethylamine, and 1.45 g. of N,N-dimethylaniline was added thereto. Then, 0.58 g. of phosphorus trichloride was added dropwise thereto at 10° to 15°C. while being cooled in ice, and the mixture was stirred at the same temperature for 30 minutes. The reaction mixture was cooled to −45° to −40°C., and 1.38 g. of phosphorus pentachloride was gradually added thereto, and then the mixture was reacted at the same temperature for 2.5 hours. Then, the reaction mixture was cooled to −50° to −45°C., and 6.2 g. of n-butanol, containing a few droplets of N,N-dimethylaniline, was added dropwise thereto, while maintaining the temperature below −45°C., and the mixture was reacted at the same temperature for 2 hours. The reaction mixture was added to 20 ml. of ice water, and was stirred for 15 minutes, and then a water layer was collected, and an organic layer was extracted with a slight amount of water. The water layer was adjusted to a pH of 3.5 by adding an ammonium carbonate while being cooled in ice, and then was stirred for 2 hours. The crystals deposited were collected, and washed with water and acetone. 1.15 g. (90%) of 7-amino-3-methyl-$\Delta^3$-cephem-4-carboxylic acid of white crystals having a decomposition point of 225°C. were obtained. The infrared absorption spectrum and thin layer chromatogram of the product was identical with those of the standard sample.

EXAMPLE 10

The procedure of Example 9 was repeated under the same reaction conditions, except that 0.92 g. of dimethylchlorophosphite was used instead of phosphorus trichloride. 1.17 g. (92%) of 7-amino-3-methyl-$\Delta^3$-cephem-4-carboxylic acid of white crystals showing a decomposition point of 225°C. were obtained.

| Protecting Groups | Mol Ratio | Yield (%) |
| --- | --- | --- |
| $(C_2H_5O)_2PCl$ | 1.2 | 90 |
| $(iso-C_3H_7O)_2PCl$ | 1.2 | 91 |
| $(n-C_4H_9O)_2PCl$ | 1.2 | 89 |
| $(C_6H_5O)_2PCl$ | 1.3 | 87 |
| $(C_6H_{11}O)_2PCl$ | 1.3 | 88 |
| $C_6H_5POCl_2$ | 0.8 | 70 |

EXAMPLE 11

The procedure of Example 9 was repeated under the same reaction conditions, except that 0.91 g. of 2-chloro-1,3,2-dioxaphosphoran was used instead of phosphorus trichloride. 1.12 g. (88%) of 7-amino-3-methyl-$\Delta^3$-cephem-4-carboxylic acid of white crystals having a decomposition point of 224°C. were obtained.

Similarly, the results of the procedures using the following compounds as the protecting groups were shown.

| Protecting Group | Mol Ratio | Yield (%) |
| --- | --- | --- |
| $CH_3PCl_2$ | 0.8 | 85 |
| $CH_3OPCl_2$ | 0.8 | 91 |
| $C_2H_5OPCl_2$ | 0.8 | 87 |
| $n-C_3H_7OPCl_2$ | 0.8 | 85 |
| $n-C_4H_9OPCl_2$ | 0.8 | 88 |

—Continued

| Protecting Group | Mol Ratio | Yield (%) |
|---|---|---|
| $ClCH_2CH_2OPCl_2$ | 0.9 | 84 |
| $ClCH_2CH_2CH_2OPCl_2$ | 0.8 | 79 |
| $CH_3CHCH_3OPCl_2$ | 0.8 | 78 |
| $ClCH_2CHCH_3OPCl_2$ | 0.8 | 81 |
| $\quad\quad Cl$ | | |
| $CH_3OCH_2CH_2OPCl_2$ | 0.8 | 87 |
| $C_2H_5OCH_2CH_2OPCl_2$ | 0.8 | 85 |
| $(CH_3O)_2SiCl_2$ | 0.8 | 89 |
| $(C_2H_5O)_2SiCl_2$ | 0.8 | 87 |
| $(n-C_3H_7O)_2SiCl_2$ | 0.8 | 87 |
| $(CH_3OCH_2CH_2O)_2SiCl_2$ | 0.8 | 85 |
| $(ClCH_2CH_2O)_3SiCl$ | 1.2 | 79 |
| $C_6H_5CH_2$<br>$\quad\quad\quad>SiCl_2$<br>$CH_3O$ | 0.8 | 84 |
| $SiCl_4$ | 0.6 | 57 |
| $ClCH_2CH_2OPOCl_2$ | 0.8 | 56 |
| $ClCH_2CHCH_3OPOCl_2$<br>$\quad\quad\vert$ | 1.0 | 48 |
| $\quad Cl$ | | |
| $CH_3CHCH_2OPOCl_2$<br>$\quad\vert$ | 1.0 | 52 |
| $\quad Cl$ | | |
| $CH_3OCH_2CH_2OPOCl_2$ | 1.0 | 64 |
| $C_6H_5OPOCl_2$ | 1.0 | 84 |
| $C_6H_5CH_2OPOCl_2$ | 1.0 | 72 |
| $C_3H_5OPOCl_2$ | 1.0 | 74 |
| $n-C_3H_7OPOCl_2$ | 1.0 | 74 |
| $n-C_4H_9OPOCl_2$ | 1.0 | 73 |
| $SOCl_2$ | 0.7 | 41 |
| $C_2H_5OCOCl$ | 1.2 | 44 |
| $C_6H_5CH_2OCOCl$ | 1.2 | 29 |
| $Cl_3C-COCl$ | 1.0 | 65 |
| $C_2H_5OSOCl$ | 1.0 | 37 |
| $C_4H_9OSO_2Cl$ | 1.2 | 48 |
| $(C_2H_5O)_2AlCl$ | 1.0 | 42 |
| $CH_3-\begin{bmatrix}O\\O\end{bmatrix}>PCl$ | 1.1 | 89 |

EXAMPLE 12

2 g. of 7-phenoxyacetamide-3-methyl-Δ³-cephem-4-carboxylic acid, 0.58 g. of triethylamine and 30 ml. of methylene chloride were mixed, and to the mixture was added 2.8 g. of N,N-dimethylaniline, and 1 g. of phosphorus oxychloride was added, dropwise, at 10° to 15°C., and the mixture was stirred at the same temperature for 1 hour. The reaction mixture was cooled to −40° to −30°C., and 1.3 g. of phosphorus pentachloride was gradually added, and was reacted at the same temperature for 2 hours. Then, the reaction mixture was cooled to −50° to −45°C., and 6.75 g. of n-butanol containing a few droplets of N,N-dimethylaniline was added, dropwise, thereto, while maintaining the temperature below −40°C., and was reacted at the same temperature for 2 hours. After the reaction mixture was added to 20 ml. of ice water, and was stirred for 15 minutes, a water layer was collected, and an organic layer was extracted with a slight amount of water. The water layer was adjusted to a pH of 3.5 by adding ammonium carbonate while being cooled in ice, and the mixture was stirred for 2 hours. The crystals deposited were collected, and washed with water and acetone. 1.05 g. (86%) of 7-amino-3-methyl-Δ³-cephem-4-carboxylic acid of white crystals showing a decomposition point of 255°C. were obtained.

EXAMPLE 13

The procedure of Example 12 was repeated under the same conditions, except that 0.85 g. of methylphosphorodichloridate was used instead of phosphorus oxychloride. 1.04 g. (85%) of 7-amino-3-methyl-Δ³-cephem-4-carboxylic acid of white crystals having a decomposition point of 225°C. were obtained.

Similarly, the results of the procedures using the following compounds as the protecting groups were shown.

| Protecting Groups | Mol Ratio | Yield (%) |
|---|---|---|
| $C_6H_5OPCl_2$ | 1 | 88 |
| $(C_6H_5CH_2O)_2PCl$ | 1.2 | 88 |

EXAMPLE 14

2.2 g. of sodium salt of cephalothin, 30 ml. of methylene chloride, and 1.8 g. of N,N-dimethylaniline were mixed and the mixture was cooled to 0° to 5°C. while being cooled in ice, and 0.8 g. of phosphorus pentachloride was added, dropwise, thereto, and was stirred at the same temperature for 30 minutes. This reaction mixture was cooled to −50° to −45°C., and 1.15 g. of phosphorus pentachloride was added, and was reacted at the same temperature for 2 hours. Then, the mixture was cooled to −60°C., and 6 g. of n-butanol, containing a few droplets of N-methylmorpholine, was added dropwise thereto while maintaining the temperature below −45°C., and the mixture was reacted at the same temperature for 2 hours. The reaction mixture was added to 20 ml. of ice water, and was stirred for 15 minutes, and then a water layer was collected, and an organic layer was combined, and the pH thereof was adjusted to 3.5 with ammonium carbonate while being cooled in ice, and was stirred for 2 hours. The crystals deposited were collected, and washed with water and acetone. 1.0 g. (72%) of 7-aminocephalosporanic acid of white crystals were obtained.

EXAMPLE 15

The procedure of Example 14 was repeated under the same conditions, except that 0.43 g. of tetrachlorosilane was used instead of phosphorus pentachloride. 0.63 g. (46%) of 7-aminocephalosporanic acid of white crystals were obtained.

Similarly, the results of the procedures using the following compounds as the protecting groups were shown.

| Protecting Groups | Mol Ratio | Yield (%) |
|---|---|---|
| $C_4H_9OBCl_2$ | 0.5 | 37 |
| $ClCH_2CH_2OPCl_2$ | 0.5 | 88 |
| $(ClCH_2CH_2O)_3SiCl_2$ | 0.5 | 92 |

EXAMPLE 16

2 g. of 7-phenylacetamido-3-methoxymethyl-Δ³-cephem-4-carboxylic acid was suspended in 30 ml. of methylene chloride, and 0.6 g. of triethylamine, and 1.35 g. of N,N-dimethylaniline was added thereto. Then, 0.6 g. of phosphorus trichloride was added, dropwise, thereto at 15° to 20°C. while being cooled in ice, and the mixture was stirred at the same temperature for 30 minutes.

The reaction mixture was cooled to −45° to −40°C., and 1.1 g. of phosphorus pentachloride was gradually added thereto, and then the mixture was reacted at the same temperature for 2.5 hours. Then, the reaction mixture was cooled to −50° to −45°C., and 5.7 g. of n-butanol containing a few droplets of N,N-dimethylaniline was added dropwise thereto while maintaining the temperature below −45°C., and the mixture was reacted at −40° to −20°C. for 2 hours. The reaction mixture was added to 20 ml. of ice water, and was stirred for 15 minutes, and then a water layer was collected, and an organic layer was extracted with a slight amount of water. The water layer was adjusted at a pH of 3.5 by adding an ammonium carbonate while being cooled in ice, and then was stirred for 2 hours. The crystals deposited were collected, and washed with water and acetone. 1.23 g. (86%) of 7-amino-3-methoxymethyl-Δ³-cephem-4-carboxylic acid of white crystals were obtained.

EXAMPLE 17

2 g. of 7-phenylacetamido-3-methylthiomethyl-Δ³-cephem-4-carboxylic acid was suspended in 30 ml. of methylene chloride, and 0.6 g. of triethylamine, and 1.3 g. of N,N-dimethylaniline was added thereto. Then, 0.6 g. of phosphorus trichloride was added dropwise thereto at 15° to 20°C. while being cooled in ice, and the mixture was stirred at the same temperature for 30 minutes.

The reaction mixture was cooled to −45° to −40°C., and 1.1 g. of phosphorus pentachloride was gradually added thereto, and then the mixture was reacted at the same temperature for 2.5 hours. Then, the reaction mixture was cooled to −50° to −45°C., and 5.5 g. of n-butanol containing a few droplets of N,N-dimethylaniline was added dropwise thereto while maintaining the temperature below −45°C., and the mixture was reacted at the same temperature for 2 hours. The reaction mixture was added to 20 ml. of ice water, and was stirred for 15 minutes, and then a water layer was collected, and an organic layer was extracted with a slight amount of water. The water layer was adjusted at a pH of 3.5 by adding an ammonium carbonate while being cooled in ice, and then was stirred for 2 hours. The crystals deposited were collected, and washed with water and acetone. 1.26 g. (87%) of 7-amino-3-methylthiomethyl-Δ³-cephem-4-carboxylic acid of white crystals were obtained.

Having now fully described the invention, it will be apparent to one of ordinary skill in the art, that many changes and modifications can be made thereto without departing from the spirit or scope of the invention.

What is claimed as new and desired to be secured by Letters Patent of the United States is:

1. A process for producing 7-aminocephalosporanic acids of the formula:

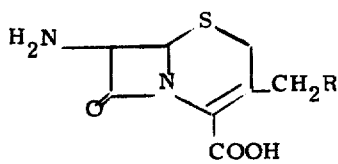

wherein R signifies a hydrogen atom, acetoxy, lower alkoxy or lower alkythio, which comprises:

A. reacting a 7-acylamidocephalosporanic acid of the formula:

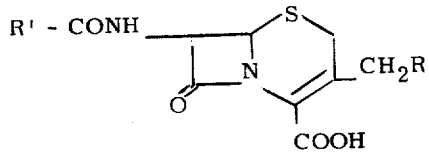

wherein R' signifies phenyl lower alkyl, phenoxy lower alkyl, thienyl lower alkyl or

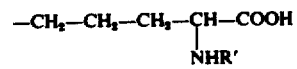

wherein R" signifies phenyl lower alkyl carbonyl and R is the same as defined above, in the presence of an acid-binding agent selected from the group consisting of triethylamine, N-loweralkylmorpholine, N-loweralkylpiperidine, quinoline, N,N-lowerdialkylaniline pyridine, picoline and lutidine, with a phosphorus compound selected from the group consisting of:

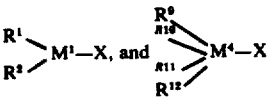

wherein each of $R^1$ and $R^2$ which may be the same or different, and signifies halogen, lower alkyl, phenyl, lower alkoxy, or lower alkoxy which is substituted by lower alkoxy, halogen, phenoxy, phenyl, cyclohexyloxy or $R^1$ and $R^2$ jointly form 1, 3, 2-dioxaphospholane; each $R^3$ to $R^{12}$ signifies halogen, lower alkoxy, lower alkoxy substituted by a lower alkoxy or halogen, phenoxy, phenyl lower alkoxy or phenyl, or $R^{11}$ and $R^{12}$ jointly signify O; $M^1$ and $M^4$ signify phosphorous; and X signifies a halogen.

B. reacting the resulting product with an imido halide-forming reagent selected from the group consisting of phosphorous oxychloride, phosphorous pentachloride, phosphorous tribromide, phosphorous pentabromide, phosgene, thionyl chloride, oxalyl chloride, protocatechinylphosphorous trichloride and toluenesulfonylchloride, to obtain the corresponding imido halide, C. reacting the resulting imido halide with a hydroxyl compound selected from the group consisting of lower alkanol, lower alkyl substituted lower alkanol, benzyl alcohol, cyclohexanol, ethyleneglygol monolower-alkyl ether, ethylene chlorohydrin, and β-cyanoethanol to obtain the corresponding imino ether, and D. hydrolyzing the imino ether to obtain 7-aminocephalosporanic acid.

2. The process according to claim 1, wherein the 7-acylamidocephalosporanic acid compound is selected from the group consisting of cephalosporin C, 7-phenoxyacetamido-3-methyl-Δ³-cephem-4- carboxylic acid, N-phenylacetylcephalosporin C, 7-phenylacetamido-3-methyl-Δ³-cephem-4-carboxylic acid, cephalothin, 7-phenylacetamido-3-methoxymethyl-Δ³-cephem-4-carboxylic acid and 7-phenylacetamido-3-methylthiomethyl-Δ³-cephem-4-carboxylic acid.

3. The process according to claim 1, wherein the phosphorus compound is a compound of the formula:

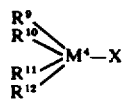

wherein $R^9$, $R^{10}$, $R^{11}$ and $R^{12}$ are as defined above.

4. The process according to claim 3, wherein the phosphorous compound is selected from the group consisting of $POCl_3$, $CH_3OPOCl_2$, $C_2H_5OPOCl_2$, n-$C_3H_7OPOCl_2$, n-$C_4H_9OPOCl_2$, $ClCH_2CH_2OPOCl_2$, $CH_3OCH_2CH_2OPOCl_2$, $C_6H_5OPOCl_2$, $C_6H_5CH_2OPOCl_2$, $PCl_5$ and $C_6H_5POCl_2$.

5. The process according to claim 1, wherein the acid-binding agent is N,N-dialkylaniline.

6. The process according to claim 1, wherein the 7-acylamidocephalosporanic acid derivatives having its carboxyl group protected is reacted with the imino halide-forming reagent at a temperature of −60°C. to 30°C.

7. The process according to claim 1, wherein the imino halide is reacted with the hydroxyl compound at a temperature of −60°C. to 30°C.

8. The process according to claim 1, wherein said phosphorous compound is the compound of the formula:

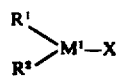

wherein each of $R^1$ and $R^2$ are as defined above.

9. The process according to claim 8, wherein the phosphorous compound is selected from the group consisting of $PCl_3$, $CH_3PCl_2$, $C_6H_5PCl_2$, $CH_3OPCl_2$, $C_2H_5OPCl_2$, $C_3H_7OPCl_2$, $C_4H_9OPCl_2$, $C_6H_5OPCl_2$, $C_6H_5OCH_2CH_2OPCl_2$, $ClCH_2CH_2OPCl_2$, $C_2H_5OCH_2CH_2OPCl_2$, $(CH_3O)_2PCl$, $(C_2H_5O)_2PCl$, $(C_3H_7O)_2PCl$, $(C_4H_9O)_2PCl$, $(C_6H_5O)_2PCl$, $(C_6H_5CH_2O)_2PCl$,

10. The process of claim 1, wherein the imido halide-forming reagent is phosgene.

11. The process of claim 1, wherein the imido halide-forming reagent is phosphorous pentachloride.

12. The process of claim 1, wherein the 7-acylamidocephalosporanic acid is reacted with phosphorous trichloride in an amount of from 0.5 to 0.8 mole per mole of acid.

13. The process of claim 1, wherein the 7-acylamidocephalosporanic acid 7-phenylacetamido-3-methyl-Δ³-cephem-4-carboxylic acid and the

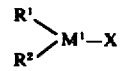

is $PCl_3$.

* * * * *